Oct. 27, 1953 H. F. KINCAID ET AL 2,657,301

ELECTRONIC HEAT-TREATING DEVICE

Filed Sept. 8, 1948 8 Sheets-Sheet 1

Inventors:
H. F. Kincaid
J. D. Graham
D. J. Reynolds
E. M. Wharff
Paul O. Pippel
Atty.

Inventors.
H. F. Kincaid
J. D. Graham
D. J. Reynolds
E. M. Wharff

Paul O. Pippel
Atty.

Oct. 27, 1953 H. F. KINCAID ET AL 2,657,301

ELECTRONIC HEAT-TREATING DEVICE

Filed Sept. 8, 1948 8 Sheets-Sheet 3

Inventors
H. F. Kincaid
J. D. Graham
D. J. Reynolds
E. M. Wharff

Paul O. Pippel
Atty.

Oct. 27, 1953 H. F. KINCAID ET AL 2,657,301

ELECTRONIC HEAT-TREATING DEVICE

Filed Sept. 8, 1948 8 Sheets-Sheet 4

Inventors.
H. F. Kincaid
J. D. Graham
D. J. Reynolds
E. M. Wharff

Paul O. Pippel
Atty.

ELECTRONIC HEAT-TREATING DEVICE
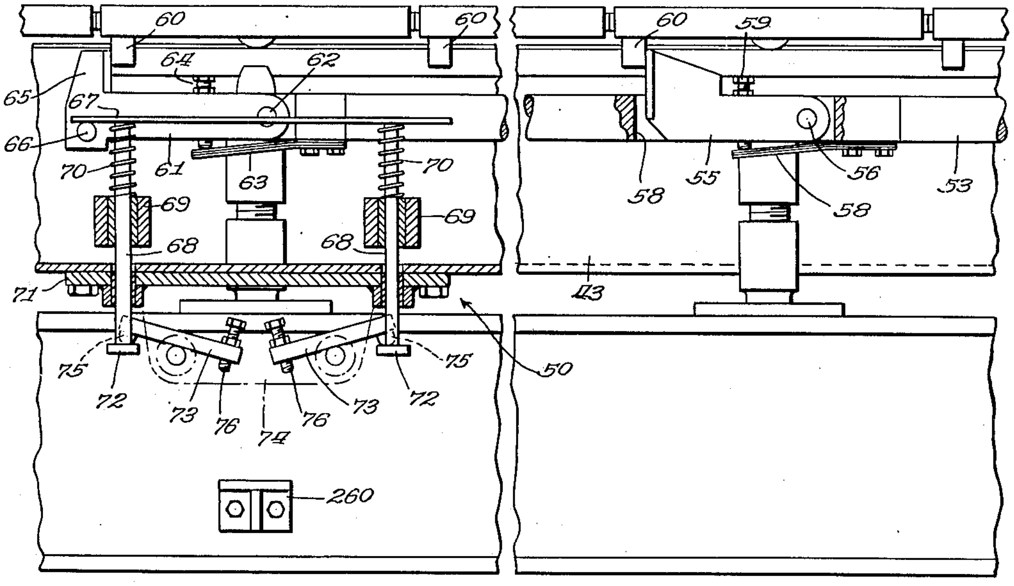
Fig. 6.
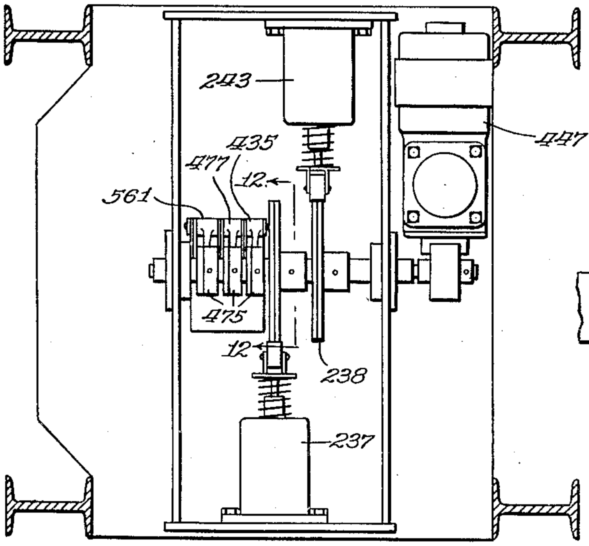
Fig. 10.
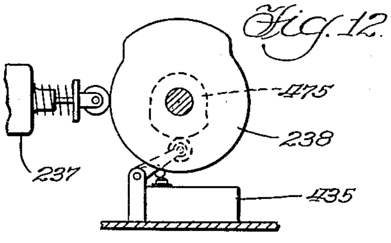
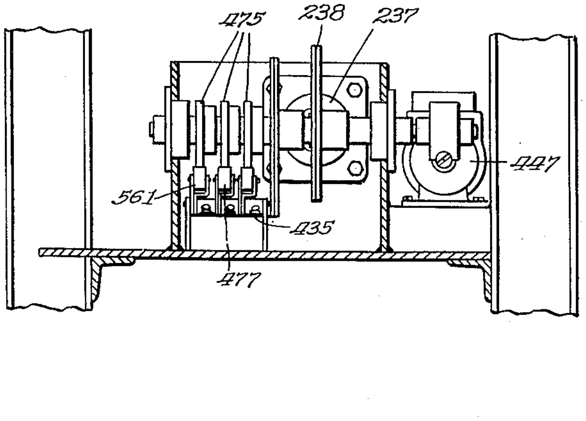
Fig. 11.
Inventors
H. F. Kincaid
J. D. Graham
D. J. Reynolds
E. M. Wharff
Paul O. Pippel
Atty.

Inventors.
H. F. Kincaid
J. D. Graham
D. J. Reynolds
E. M. Wharff
Paul O. Pippel
Atty.

ELECTRONIC HEAT-TREATING DEVICE

Inventors
H. F. Kincaid
J. D. Graham
D. J. Reynolds
E. M. Wharff

Paul O. Pippel
Atty.

ELECTRONIC HEAT-TREATING DEVICE

Inventors
H. F. Kincaid
J. D. Graham
D. J. Reynolds
E. M. Wharff
Paul O. Pippel
Atty.

Patented Oct. 27, 1953 2,657,301

UNITED STATES PATENT OFFICE 2,657,301

ELECTRONIC HEAT-TREATING DEVICE

Homer F. Kincaid, Carbon Cliff, Ill., John D. Graham, Louisville, Ky., Delos J. Reynolds, Chicago, Ill., and Edward M. Wharff, Baltimore, Md., assignors to Westinghouse Electric Corporation, a corporation of Pennsylvania, and International Harvester Company, a corporation of New Jersey, jointly Application September 8, 1948, Serial No. 48,296

12 Claims. (Cl. 219—47)

This invention relates to an apparatus for heat treating metal articles. More particularly, this invention relates to an apparatus that is automatically operable to subject a plurality of metal articles to a complete heat treating cycle for the purpose of producing a hardened surface on the article treated.

The speed with which metal articles are heat treated by induction is well-known to those familiar with the art. In the treatment of articles having irregular contours such as gears, racks and sprockets, it is desirable to subject the articles to certain definite novel treating processes in order to secure an efficient article having a surface zone hardened to a predetermined hardness. Such a process is clearly set forth in the H. F. Kincaid et al. Patent No. 2,564,906 entitled "Heat Treatment of Irregular Objects," patented August 21, 1951. In a process of the type disclosed in the aforementioned application a number of heating and quenching stations are provided and the article to be treated is subjected to a certain operation at each station. It can readily be appreciated that in a process of this type the time factor is of great importance and it is therefore desirable to provide an apparatus that will deliver the articles to the station promptly and uniformly so that a uniform hardened article will result. It is applicants' prime object, therefore, to provide a novel heat treating apparatus that is effective to heat treat an article in an efficient and uniform manner.

Another object is to provide a heat treating apparatus including a plurality of treating stations, and a handling mechanism for delivering articles to the stations, said handling mechanism being arranged to continually deliver articles to the heat treating station, said handling mechanism including means for ejecting the articles after they have been treated.

A specific object is to provide an apparatus including a plurality of heat treating stations, said apparatus including an endless conveyor arranged to move articles to be treated adjacent to a plurality of heat treating stations, said conveyor including a mechanism for moving each article to be treated successively into an electromagnetic field produced at each station.

A further specific object is to provide a heat treating mechanism including a plurality of heat treating stations, each station including an inductor ring, a mechanism for simultaneously delivering a plurality of articles to be treated into the inductor rings, and means for rotating the articles to be treated within each inductor ring.

A still further specific object is to provide an improved conveyor apparatus for delivering articles to be treated to an electromagnetic field, said conveyor including a plurality of movable trays adapted to support the articles to be treated, and a novel mechanism for removing the treated articles from the conveyor.

Another object is to provide an apparatus for heat treating metal articles, said apparatus including a plurality of inductor rings and means for providing an electromagnetic field within the rings.

A still further object is to provide a heat treating apparatus having a plurality of continually energized inductor rings and a cooling means for cooling said rings during a time interval previous to the delivery of articles to be treated to said rings.

Still another object is to provide a plurality of inductor rings having means arranged to provide for an electromagnetic field within said rings and a cooling chamber for cooling each ring prior to the delivery of an article to be treated to said ring, said cooling chamber being displaceable from the ring upon the movement of an article to be treated into said ring.

These and other objects will become more apparent as the description proceeds and upon an examination of the accompanying drawings.

In the drawings:

Fig. 6 is a detail side view of a portion of the actuating mechanism for the conveyor, said view being taken substantially along the line 6—6 of Fig. 1.

Fig. 10 is a sectional view through the supporting structure of a heat treating apparatus, said view showing a control mechanism and being taken generally along the line 10—10 of Fig. 1.

Fig. 11 is a front view of the control mechanism shown in Fig. 10.

Fig. 12 is a sectional view generally taken along the line 12—12 of Fig. 10.

Figure 1:
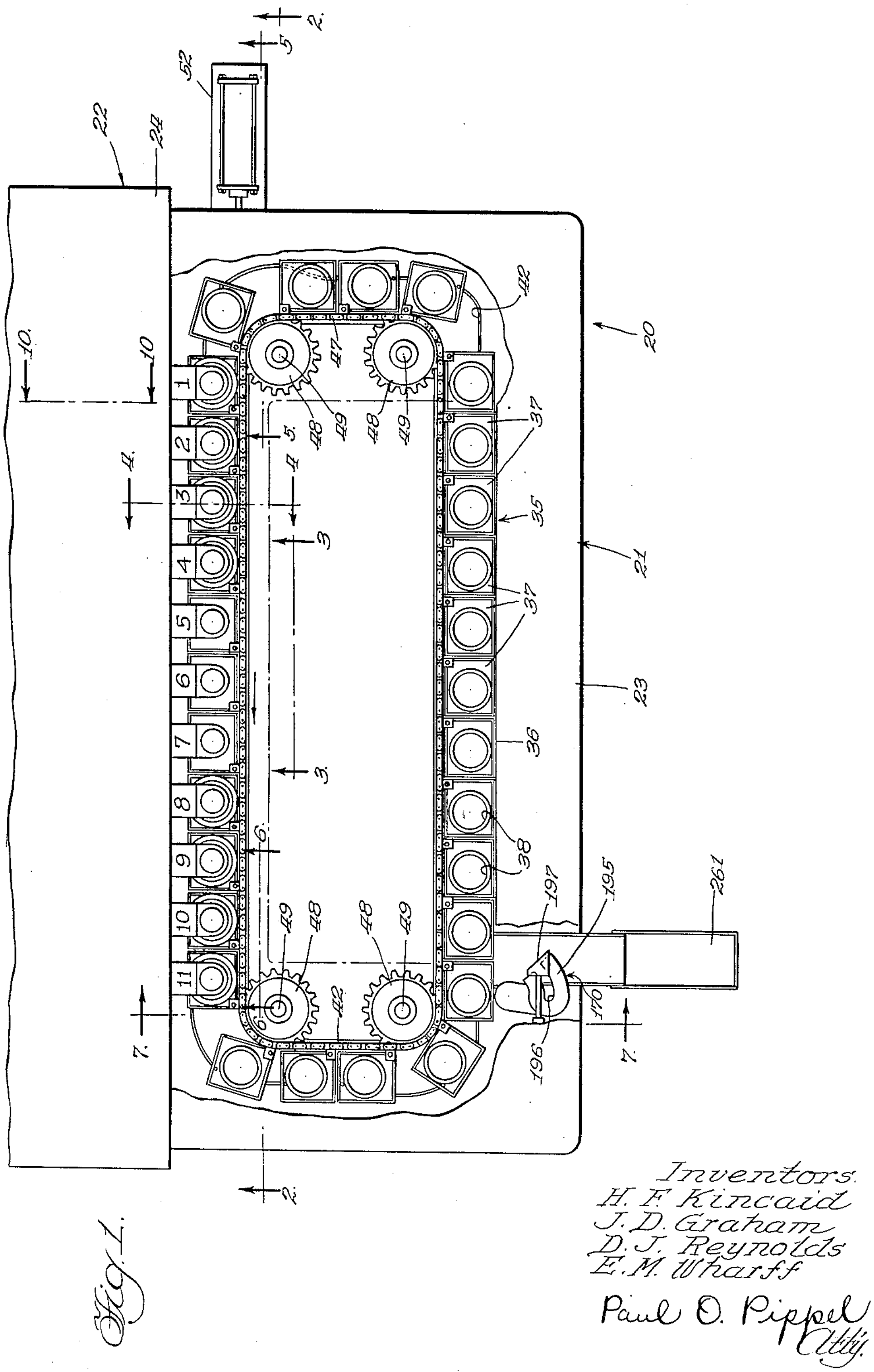
Fig. 1 is a plan view of a heat treating apparatus.
Figure 2:
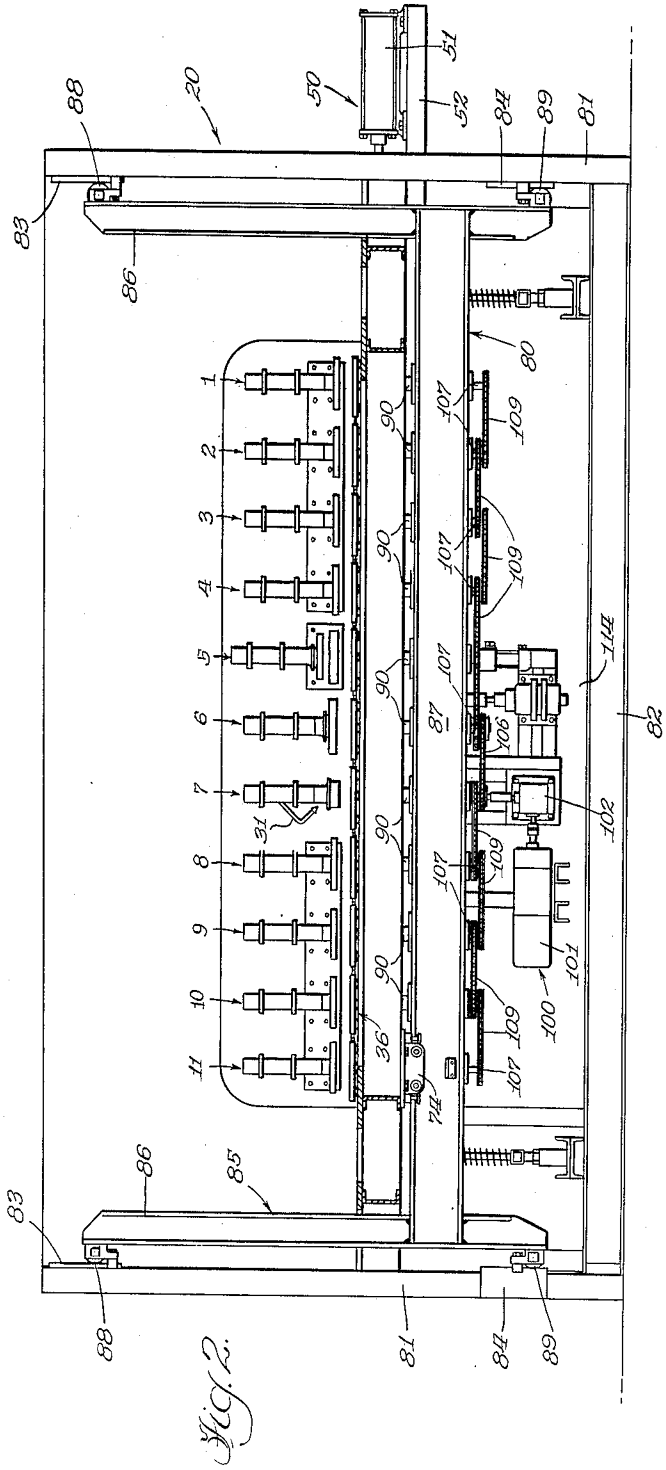
Fig. 2 is a sectional view showing a plurality of heat treating stations, said view being taken substantially along the line 2—2 of Fig. 1.

Referring particularly to Figs. 1 and 2, the reference characters 1 through 11 inclusive relate to a plurality of heat treating stations which are positioned in horizontally spaced relation. The heat treating stations 1 to 11 are a part of a heat treating apparatus generally indicated by the reference character 20. The heat treating apparatus 20 generally includes housing structures of sheet metal designated by the reference characters 21 and 22. The housing structures 21 and 22 respectively include sheet metal enclosures 23 and 24.

*The heating, quenching, and drawing stations*

As best shown in Figs. 1 and 2, stations 1 to 4 inclusive relate to a plurality of pre-heating stations. Station 5 is a pre-quench and radio frequency heating station. Station 6 is a quench station for quenching the gears subsequent to heat treatment at the pre-quench station. The reference character 7 relates to a blow-off station, and stations 8 to 11 are the drawing or post-heat stations.

Figure 3:
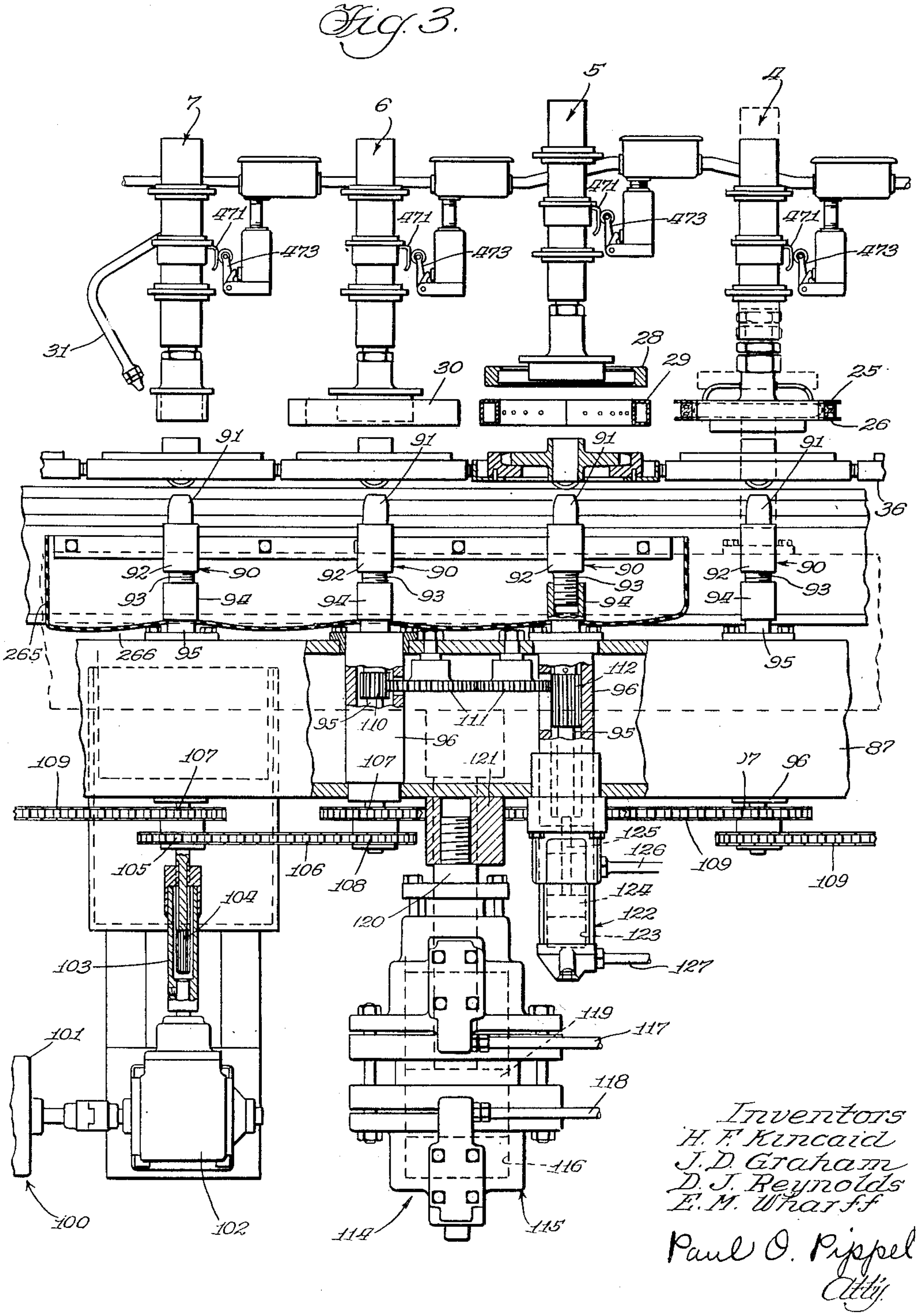
Fig. 3 is an enlarged side view of certain heat treating stations, portions of said stations being shown in section, this view being taken substantially along the line 3—3 of Fig. 1.
Figure 4:
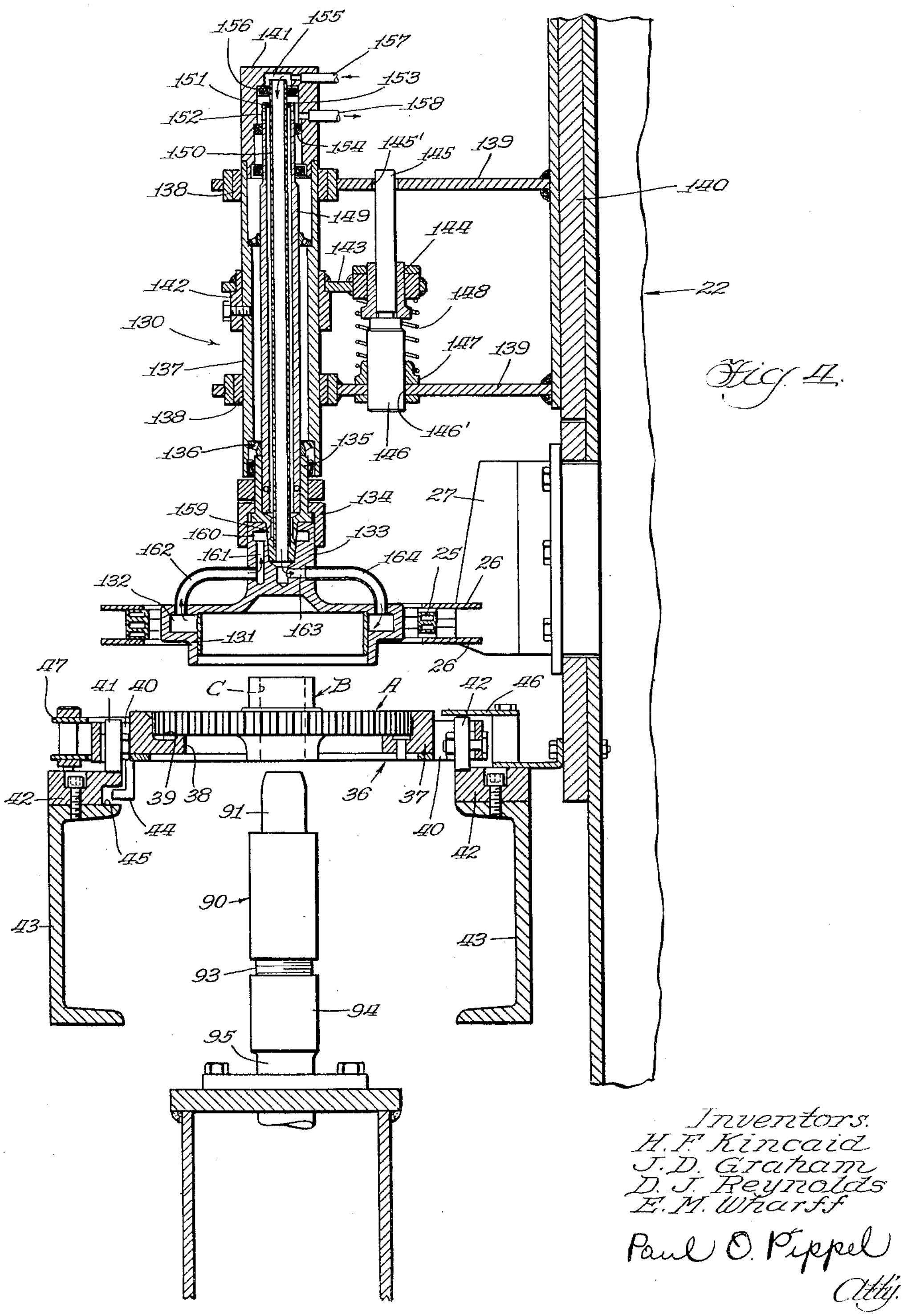
Fig. 4 is a sectional view through a pre-heating station, said view being taken substantially along the line 4—4 of Fig. 1.

In each of the pre-heat stations 1 to 4 and in the draw stations 8 to 11 an inductor coil or ring 25 is provided. The inductor ring 25, as best shown in Fig. 4, is positioned between a pair of vertically spaced plates 26 which are rigidly secured by brackets 27 to a portion of the housing structure 22. The pre-quench station 5 as best shown in Fig. 3 includes a pre-quench inductor ring 28. Immediately below and in axial alignment with the inductor ring 28 is a quench coil 29.

A quench coil 30 is provided at station 6. It should be noted that stations 6 and 7 are not equipped with inductor rings. A blow-off nozzle 31 is provided at station 7.

*The conveyor mechanism*

Figures 7, 8, 9:
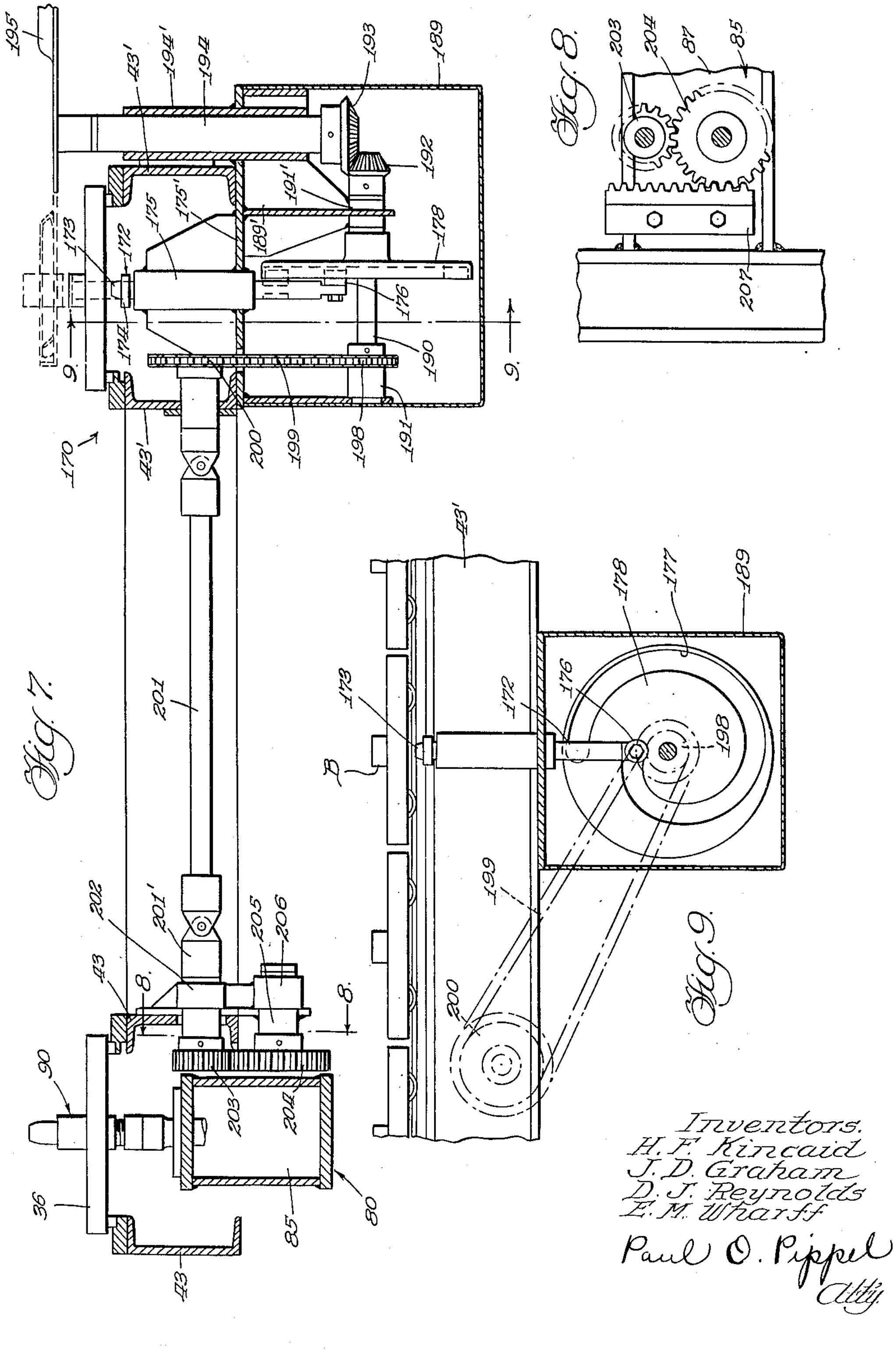
Fig. 7 is a sectional view of an ejecting mechanism for an endless conveyor, said view being taken along the line 7—7 of Fig. 1.
Fig. 8 is a detail view of an actuating mechanism for an ejection device, said view being taken along the line 8—8 of Fig. 7.
Fig. 9 is a detail sectional view of a portion of an ejection mechanism taken along the line 9—9 of Fig. 7.

The conveyor mechanism is generally referred to by the reference character 35. The conveyor mechanism includes an endless conveyor 36 best shown in Figs. 1, 2, 3 and 4. The endless conveyor 36 comprises a plurality of inter-connected trays 37. Each tray 37 is provided with a centrally located opening 38 which as best shown in Fig. 4, is peripherally adjacent to an annular shoulder 39. Each tray 37 is also provided with laterally spaced brackets 40 extending outwardly of the trays 37. The brackets 40 are provided for rotatably supporting track wheels 41. The track wheels 41 are movable upon endless tracks 42. As best shown in Fig. 1, the endless tracks 42 extend in the form of a rectangle, the trays being movable about the rectangle for delivering articles to and from the heat treating stations. The endless tracks 42 are supported upon horizontally extending channel beams 43 as best shown in Fig. 4, and channel beams 43' as best shown in Fig. 7. Each tray includes a downwardly extending L-shaped guiding element 44, said guiding element having a portion extending into a recess 45 formed in the endless track 42. As best shown in Fig. 4, a cover plate 46 extends over the outermost track wheel of each tray for retaining the trays on the tracks 42 against vertical displacement.

As best shown in Fig. 4, a gear A is supported on the tray 37. The outer peripheral edge of the gear A rests upon the annular shoulder portion 39, said gear A thus being supported across the center opening 38 of the tray 37. The gear A is of conventional design and includes a hub portion B provided with a center opening C.

As best shown in Figs. 2 and 4 the trays are interconnected by means of an endless chain 47, each tray being suitably connected to the chain links of the chain. The chain 47 is trained around sprockets 48, two of which are provided at each end of the apparatus. The sprockets 48 are freely rotatable about vertical axes on shafts 49.

*The indexing mechanism*

The arrangement of the endless conveyor 36 and the movable trays 37 has just been described. The endless conveyor is movable in the direction of the arrow as best shown in Fig. 1. Each tray 37 is adapted to be placed into successive vertical alignment with each of the stations 1 through 11. Thus the gears carried on the conveyor are also successively placed into vertical alignment with each station. In order to move the conveyor so that the gears are thus successively placed in vertical alignment with each station an indexing mechanism is provided. The indexing mechanism is generally referred to by the reference character 50. As best shown in Figs. 1, 2, 5 and 6, the indexing mechanism includes a pneumatic cylinder 51 which is supported on a table 52 connected to one end of the housing structure 21. A piston rod 53 projects outwardly of the cylinder 51, said piston rod including within the cylinder 51, a piston 54. The piston 54 is adapted to reciprocate within the cylinder 51.

Figure 5:
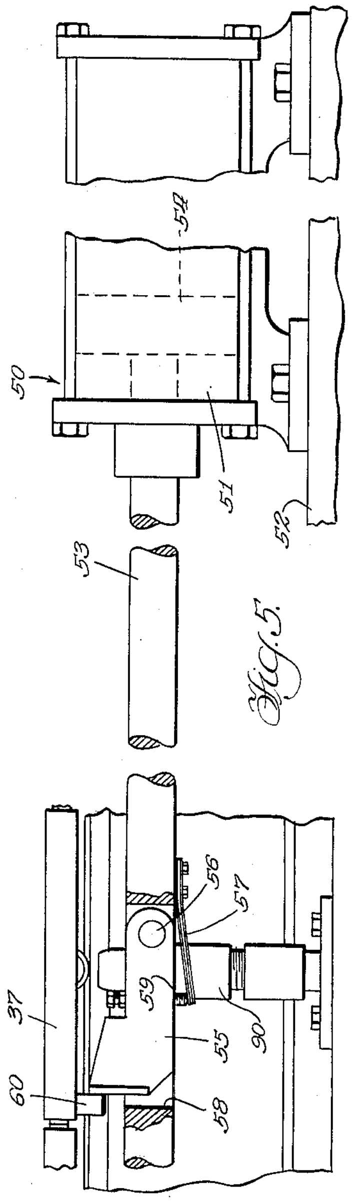
Fig. 5 is a detail side view of an actuating mechanism for moving an endless conveyor, said view being taken generally along the line 5—5 of Fig. 1.

A dog 55, as best shown in Fig. 5, is connected to the piston rod 53. The dog 55 is pivoted at 56 on the piston rod 53 for vertical pivotal movement with respect thereto. A leaf spring 57 normally urges the dog 55 upwardly within a recess 58 provided in the piston rod 53. The leaf spring 57 is in contact with an adjustable set screw 59 connected to the dog 55. Each tray 37 is provided with a downwardly projecting dowel pin 60, and the end of the dog 55 is adapted to engage each pin 60 for moving the trays upon reciprocation of the piston rod 53.

As best shown in Fig. 6, the end of the piston rod 53 is provided with an indexing dog 61. As will appear later from the operation, the indexing dog is for the purpose of limiting the travel of the conveyor during the indexing movement provided by the dog 55 so that each tray is successively moved from one station to the other, each tray adjacent each station at all times being in vertical alignment with said station. The indexing dog 61 is pivotally connected as indicated at 62 to the piston rod 53. A leaf spring 63 is normally in contact with a set screw 64 which in turn is connected to the dog 61, whereby the leaf spring 63 normally urges the end of the dog 61 upwardly. The dog 61 is provided with a hook portion 65 which is adapted to act as a stop against each pin 60 of each tray 37.

The dog 61 further includes a transversely extending pin 66 which is in abutting relation with a horizontally extending plate 67. The plate 67 is fixedly secured at each end to a pair of horizontally spaced pins 68. The pins 68 are vertically movable within a pair of spaced bearing members 69 which in turn are secured to one of the channel beams 43. A spring 70 is threaded upon each pin 68 and is positioned between the plate 67 and the bearing member 69. A bearing plate 71 is rigidly secured to the lower surface of the channel beam 43, the pins 68 extending through said plate 43. The pins 68 are each provided at their lower ends with a head 72. A pair of rocker arms 73 are pivotally connected to the lower surface of the channel beam 43 by means of a downwardly extending plate 74. Each rocker arm 73 is provided with a contact point 75 that is in operative engagement with each head 72 of the vertically movable pins 68. The other end of each rocker arm 73 is provided with a set screw 76 adapted to be engaged by a movable contact element which will be described later.

*The spindle carrying mechanism*

A spindle carrying mechanism is generally indicated by the reference character 80. The spindle carrying mechanism 80 is best shown in Fig. 1 and includes a pair of horizontally spaced uprights 81. The uprights 81 are rigidly connected by means of a lower horizontal channel 82. Each upright is provided with an upper track plate 83 and a lower track plate 84. A bridge 85 or support is positioned between the uprights 83 for vertical movement with respect thereto. The bridge 85 includes a pair of transversely spaced vertically movable channels 86 which are rigidly connected to a horizontally extending beam 87. The upper end of each channel 86 is provided with upper track rollers 88 which are arranged to engage and ride upon the upper track plates 83. The lower end of each channel 86 is provided with lower track rollers 89 arranged to ride upon the track plates 84.

The horizontally extending beam 87 is best shown in Figs. 4 and 7 and is shaped in the form of a box section. The beam 87 rotatably supports a plurality of spindles or vertical supports generally referred to by the reference character 90. As best shown in Figs. 2 and 3 eleven spindles 90 are provided. Each spindle 90 is in axial alignment with a corresponding heat treating station. Each spindle 90 also includes a circular tip portion 91 which is adapted to be placed into telescoping engagement with the opening C provided in each gear A as best shown in Fig. 4. Each spindle 90 also includes an enlarged collar 92 which is provided at its lower end with a threaded projection 93. The threaded projection 93 is screwed into, as best shown in Fig. 3, a socket 94 which in turn is connected to a driving shaft 95 provided for each spindle. Each driving shaft 95 is in turn journaled within a vertical bearing member 96. Each bearing member 96 is rigidly secured to the horizontally extending beam 87. From this description it can therefore be seen that each spindle is adapted to rotate within each vertical bearing member 96.

*The spindle driving mechanism*

The spindle driving mechanism is best shown in Figs. 2 and 3, said mechanism being generally designated by the reference character 100. As best shown in Figs. 2 and 3, an electric motor 455 is supported on the housing structure 21. The electric motor 455 is in driving engagement with a gear reduction mechanism 102. The gear reduction mechanism in turn drives a drive shaft 103 which in turn is in telescoping driving engagement with a spline shaft 104. The spline shaft 104 is in turn connected to drive a sprocket 105 which in turn drives a chain 106. Each driving shaft 95 (with the exception of the driving shaft at station 5) is provided at its lower end with a sprocket 107. As best shown in Fig. 3, the chain 106 drives a sprocket 108. The sprocket 108 is connected to the driving shaft 95 of the spindle 90 which is in axial alignment with the heat treating station 6. Likewise, the sprocket 105 is connected to the lower end of the driving shaft 95 located in axial alignment with heat treating station 7. Upon driving movement of the chain 106, therefore, the sprockets 107 at stations 6 and 7 are driven. The rotation of these sprockets 107 thereupon drives a series of chain and sprocket drives 109 which in turn rotates each driving gear 107 connected to each driving shaft 95, thereupon in turn rotating each of the spindles 90 provided at each heat treating station 1 through 4 and 6 through 11.

The spindle 90 which is in axial alignment with the pre-quench station 5 is driven by means of a gear 110 which is connected and driven by the shaft 95 of the spindle at station 6 as best shown in Fig. 3. The gear 110 drives a pair of driven gears 111 which are pivotally connected within the beam 87. The gears 111 in turn drive a vertically movable gear 112. The gear 112 is vertically adjustable within the bearing member 96 and moves with the driving shaft 95 as will be presently described. In view of the vertical length of the gear 112 the same will at all times remain in mesh with the gear 111 during vertical adjustment of the driving shaft 95.

*The bridge raising and lowering mechanism*

The bridge raising and lowering mechanism is generally designated by the reference character 114, as best shown in Figs. 2 and 3, and includes a stationary pneumatic unit 115. The unit 115 includes a two-way cylinder 116 which is suitably connected by means of air conduits 117 and 118. The conduits 117 and 118 are provided for delivering air to the cylinder 116, thereupon reciprocating a piston 119. The piston 119 is in turn connected to a piston rod 120, the end of which is threaded into a block 121. The block 121 is rigidly fixed to the lower surface of the beam 87. The pneumatic unit 115 is stationarily secured to the housing structure 21 and upon reciprocation of the piston rod 120 the bridge 80 is moved upwardly or downwardly.

As best shown in Fig. 3, a pneumatic unit 122 is movably supported on the bridge 87. The pneumatic unit 122 includes a cylinder 123 which is fixedly connected to the beam 87. A piston 124 is reciprocable within the cylinder 123 and the piston in turn is connected to a piston rod 125. The piston rod 125 is in turn connected to the driving shaft 95 provided at station 5. Conduits 126 and 127 are in communication with the cylinder 123.

*The inductor ring cooling system*

Figure 13:
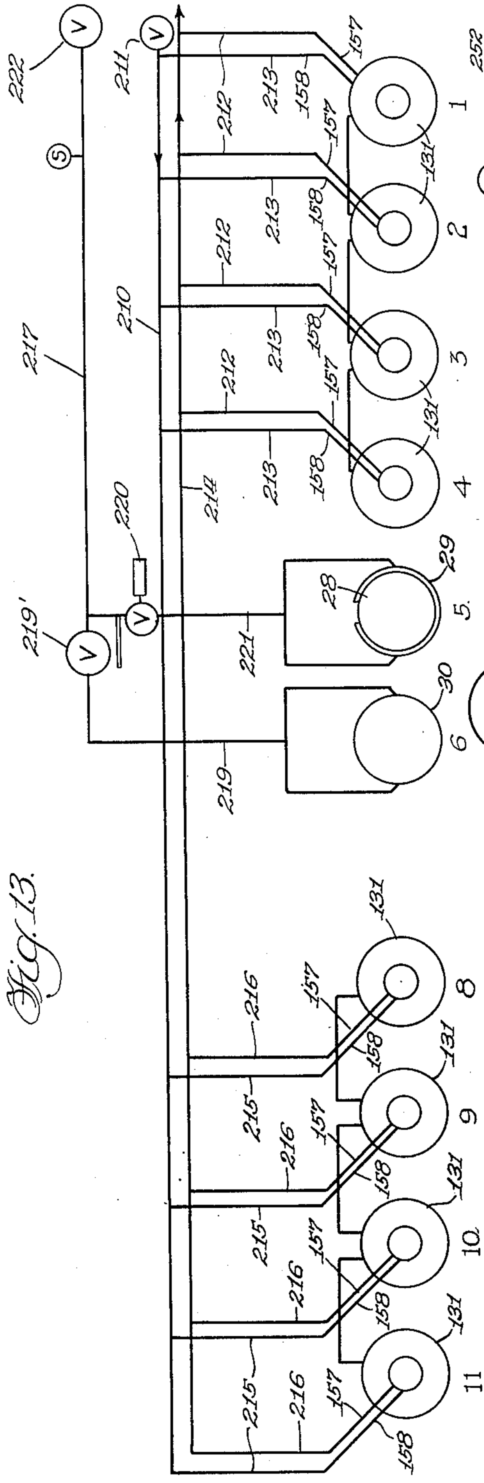
Fig. 13 is a schematic view of a quench diagram for a heat treating apparatus.

The inductor ring cooling system is generally referred to by the reference character 130 and is best shown in Figs. 4 and 13. The cooling system is provided at each of the pre-quench stations 1 through 4 and at the draw stations 7 through 11. For the purpose of this disclosure Fig. 4 is shown to be typical of these stations.

Referring now to Fig. 4, the cooling system 130 includes a casing 131. The casing 131 projects into the inductor ring 25 and includes an annular chamber 132. The chamber 132 is adjacent the peripheral inner edge of the inductor ring 25. An upwardly extending neck portion 133 is connected to the casing 131. The neck portion 133 is rigidly secured by means of a collar 134 to a rotating sleeve 135. The rotating sleeve 135 is pivoted for rotation within bearing members 136 which are in turn secured within a tubular support 137.

The tubular support 137 is in turn vertically movable within a pair of vertically spaced bearing members 138. The bearing members 138 are in turn rigidly secured to a pair of horizontally extending brackets 139 which are rigidly secured to a portion 140 of the housing structure 22.

A tubular cap member 141 is connected to the end of the tubular support 137 for closing the same. A collar 142 is rigidly fixed to the tubular support 137. This collar is in turn connected to a bracket 143 which supports a collar 144. The collar 144 is secured to a vertical aligning or guide pin 145 which may be reciprocated through an opening 145′ in the uppermost bracket 139. The lower end of the guide pin 145 is provided with an enlarged circular portion 146 which is adapted to reciprocate within an opening 146′ provided in the lowermost bracket 139. A sleeve 147 is secured to the lower bracket 139, the sleeve in turn supporting a spring 148 which resiliently holds the tubular support 137 in the position shown in Fig. 4.

An outer tube or conduit 149 is positioned within the tubular support 137. A tube 150 is positioned within the outer tube 149, said tube 150 being of lesser outside diameter than the inner diameter of the tube 149. The outer tube 149 is sealed at its upper end as indicated at 151. The tube 149 is provided at its upper end with an opening 152 which is in communication with a chamber 153 provided in the cap 141. The chamber 153 is sealed by means of a liquid seal 154. The inner tube 150 is also open at its end and is in turn in communication with a chamber 155 provided in the cap 151. The chamber 155 is sealed from the chamber 153 by means of a seal 156. A conduit 157 is in communication with the chamber 155, and a conduit 158 is in communication with the chamber 153. The outer tube 149 is in communication with a bore 159 which is provided in a lower portion of the rotating sleeve 135. The bore 159 is in communication with an annular recess 160 provided in the upper end of the collar 133. The chamber 160 is in turn in communication with a vertical bore 161 which is connected to a branch conduit 162. The branch conduit 162 is in turn in communication with the chamber 132.

The conduit 150 is at its lower end in communication with a transverse bore 163 formed in the neck portion 133. The bore 163 is in turn in communication with a branch conduit 164 in communication with the chamber 132.

*The gear ejecting mechanism*

The gear ejecting mechanism is referred to by the reference character 170 as best shown in Figs. 1, 7, 8 and 9. As best shown in Fig. 7, a vertically movable shaft 172 is positioned between the spaced horizontally extending channels 43′. The channels 43′ extend in the same horizontatl plane as the channels 43 previously described. The shaft 172 includes at its upper end a circular tip portion 173 and a collar 174. The tip 173 is similar to the tip 91 of the spindle 90 and is for the purpose of joining in telescoping relation with the openings C of the gears A. The shaft 172 is vertically adjustable within a bearing sleeve 175 which is connected to a plate 175′ connected across the lower surfaces of the channels 43′. The lower end of the shaft 172 has pivoted thereon a cam roller 176. The cam roller 176 is adapted to roll within a helical track 177 provided in a cam 188. The cam 188 is positioned within a housing 189 which is supported by the lower portions of the channels 43′.

The cam 188 is rigidly fixed to a shaft 190, the shaft 190 being positioned within a bearing 191 rigidly secured to the housing 189. A second bearing 191′ is supported by a bracket 189′ which extends downwardly from the plate 175′. The shaft 190 is rotatable within the bearings 191 and 191′ and is provided at its extreme end with a pinion 192 in turn meshing with a pinion 193 which in turn is rigidly fixed to a vertically extending shaft 194. The shaft 194 is journalled for rotation within a bearing 194′ which is rigidly secured to the housing 189.

An ejecting arm 195 is rigidly secured to the upper end of the shaft 194. As best shown in Fig. 1 the ejecting arm 195 is provided with an arcuate slot 196, the purpose of which will appear later. A stationary stop 197 is connected to a portion of the housing 21, said stop having a surface substantially in vertical alignment with the arcuate slot 196.

The shaft 190 is driven by means of a sprocket 198 which is in turn driven by a drive chain 199 from a sprocket 200. The sprocket 200 is in turn rotated by means of a universal drive shaft 201 which is driven by means of a stub shaft 201′ journalled within a bearing bracket 202 which is rigidly secured to one of the channels 43. The stub shaft 201 has connected for driving engagement therewith a gear 203 which in turn meshes with a gear 204 driven by means of a stub shaft 205. The stub shaft 205 in turn extends through a bearing 206, an integral part of the bearing 202. As best shown in Fig. 8 the gear 204 is in meshing engagement with the teeth of a rack 207. The rack 207 is in turn connected to the beam 87 of the bridge 85.

*The quench and cooling system diagram*

The quench and cooling system is best shown in the schematic diagram of Fig. 13. This system consists essentially of a main cooling fluid inlet line 210. A shut-off valve 211 is provided at one end of the line for suitably regulating the flow of fluid thereto. A branch inlet conduit 212 extends to each of the conduits 157 of the casings 131 provided at stations 1 to 4 inclusive. A branch outlet conduit 213 extends from the conduits 158 of the casings 131 back to a main outlet conduit 214.

Branch inlet conduits 215 extend from the main conduit 210 to each of the conduits 157 of the casings 131 provided at the draw stations from 8 to 11 respectively. Branch drain conduits 216 extend from the conduits 158 of the casings 131 to the main outlet conduit 214. A quench branch conduit 219 extends from the quench ring 30 to a quench fluid conduit 217. A shut-off valve 219' is provided in this system. The conduit 217 is also in communication with a quench water conduit 221 which extends to the quench coil 29 at station 5. A pneumatic gate valve 220 is provided between the conduits 221 and 217. A regulating valve 222 is provided at the end of the system 217 for regulating the same.

*The pneumatic circuit diagram*

Figure 14:
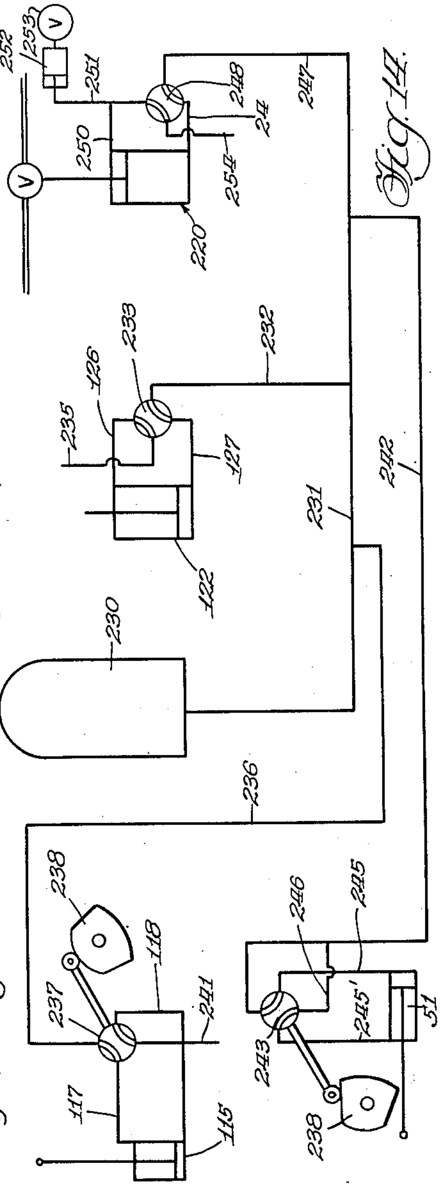
Fig. 14 is a schematic view of a pneumatic system for a heat treating apparatus.

As best shown in Fig. 14 the pneumatic circuit consists essentially of an air reservoir 230. The air reservoir includes a main conduit 231. A branch conduit 232 extends from the main conduit 231 to a magnetically operated four-way valve 233. The valve 233 is adapted to place the conduit 232 into communication with the conduit 126 which leads to one end of the pneumatic unit 122 for regulating the pneumatic cylinder 123 at station 5. As has previously been described, this cylinder is a two-way type and the conduit 127 is also adapted to be placed into communication with the conduit 232 by means of the valve 233. An exhaust conduit 235 is also in communication with the valve 233.

A conduit 236 is also in communication with the conduit 231 and the conduit 236 is in communication with a cam actuated valve 237. The cam actuated valve 237 is adapted to be operated by a cam 238, the operation of which will be described later. The conduit 117 is adapted to be placed in communication with the conduit 236 by means of the valve 237, the conduit 117 being connected to one end of the pneumatic unit 115. The unit 115 has been previously described as functioning to raise and lower the bridge 85. The pneumatic unit 115 is also of a two-way type and the conduit 118 is adapted to be placed into communication with the conduit 236 by means of the valve 237. An exhaust conduit 241 is adapted to be regulated by the valve 237.

A conduit 242 is in communication with the main conduit 231, the conduit 242 being controlled by a four-way cam actuated valve 243. The valve 243 is moved by means of the cam 238, said cam being drawn twice for diagrammatic purposes. A conduit 245 may be placed into communication with the conduit 242 by means of the valve 243, said conduit 245 leading to one end of the cylinder 51 which is provided to actuate the indexing mechanism 50 as previously described. The cylinder 51 is of a two-way type and a conduit 245' is adapted to be placed into communication with the conduit 242 by means of the valve 243. An exhaust conduit 246 is also in communication with the valve 243.

A conduit 247 is in communication with the conduit 231. The conduit 247 is provided at one end with a magnetically operated four-way valve 248. A conduit 249 is adapted to be placed into communication with the conduit 247 by means of the valve 248. The conduit 249 is in turn in communication with a pneumatically operated gate valve 220 also shown in the quench and cooling system of Fig. 13. The valve 220 as previously mentioned is provided for the purpose of regulating the quench fluid from the conduit 217 to the quench coil 29 of station 5. The cylinder of the pneumatic gate valve 220 is of a two-way type and is provided with a conduit 250 which may be placed into communication with the conduit 247 by means of the valve 248. A conduit 251 is in communication with a cylinder 252 operable to actuate a valve 253, which in turn controls the air flow through the blow-off nozzle 31 of Fig. 3. An exhaust conduit 254 is arranged to be placed into communication with the valve 248.

*Operation*

The gear handling apparatus which is disclosed is particularly suitable for the heat treating of objects of irregular contour such as the gears A which are supported on each of the trays of the conveyor. It must be understood, however, that any type of article may be hardened by this apparatus and the same is not confined merely to the hardening of gears. The Kincaid et al. application which has previously been mentioned sets forth a novel process for treating gears. The treatment of the gears in this process consists of subjecting the articles to treatment at a plurality of stations, the articles thereupon being successively indexed from one station to the other until the predetermined surface hardening of the gear is effected. The gears are first indexed through the four pre-heating stations 1, 2, 3 and 4. At each of these four stations the gear is subjected to an electro-magnetic field of audio frequency, preferably between the limits of 960 to 9,600 cycles.

The field at each station is produced by the inductor blocks or rings 25 which are energized from audio frequency generators. The time interval to which the gear is subjected at the field is so related to the time it is indexed that after being heated at the four stations the gear has a temperature near the point of 900° F., this temperature being substantially below the transformation temperature of steel.

After the gear has been indexed to the fourth station, it then passes on to the fifth, where a heat and quench operation is effected. At this station the contour hardening of the gear takes place. The inductor block 28 is energized from a radio frequency generator having a frequency between 90,000 and 450,000 cycles. Accordingly, the gear at this station is subjected to a radio frequency electromagnetic field. The duration of the radio frequency heating is substantially shorter than the duration of the pre-heating and the process is effective to heat the gear over a shallow band extending along the contour of the teeth of the gear. After the gear has been subjected to the radio frequency field, it is then lowered into the quench coil 29.

At this time a quenching fluid (preferably of water or oil) is projected on the gear 20. The quenching fluid thereupon partially quenches the gear. The gear is thereupon indexed to station 6, where it again is subjected to a quenching fluid from the quench ring 30. The gear is now properly quenched and suitably hardened.

From station 6 the gear is indexed to station 7 where the blow-off nozzle 31 is effective to blow off any excess particles of water or quenching fluid that might remain on the gear.

The gear is now indexed from stations 8 through 11, whereupon it again enters into an audio frequency electromagnetic field at each of the inductor blocks 25. The fields are applied for the same duration as the preheating fields and operate to reheat the gears to approximately 350° F. The gears are thereupon drawn and moved out of station 11, where they are subsequently ejected from the conveyor. The heat treating cycle through which each gear must pass has thus been described. The operation of the novel mechanism for indexing each gear through the cycle will now be described.

Since the apparatus is almost completely automatic only one operator is required. The operator stands at the front of the machine and places the gears to be treated on the trays 37 of the conveyor. For the purpose of discussing the operation it will be assumed that a gear is positioned at each of the eleven stations. With this assumption then the gear positioned at station 11 is ready to be moved from the station and subsequently discharged as a fully treated article. Therefore, the next step in the operation of the machine is to index or move the conveyor, thereupon in turn advancing each unfinished gear one more station. The piston 53 thereupon moves toward the left when viewed in connection with Fig. 6. As the piston reciprocates the dog 55 engages the pin 60 of one of the trays and moves the trays along the endless tracks 42.

As the piston 53 thus moves to advance the trays 37 the hook portion 65 of the indexing dog 61 remains in contact with one of the pins 60 as shown in Fig. 6. The indexing dog 65 serves to restrain the conveyor from rolling beyond the point desired by its own inertia. At each stroke or movement of the piston arm 53 each tray is moved a distance equivalent to the distance between each station. The trays, as they pass underneath the stations, must be in direct axial alignment with the inductor ring of each station and the novel indexing mechanism and specifically the indexing dog serves to move the conveyor evenly so that each tray is accurately moved one station and remains in this position until subsequent actuation of the piston arm 53. The gears on the conveyor have now advanced one station and they are prepared for the next treating operation.

The pneumatic unit 115 is thereupon placed into actuation and the piston rod 120 is moved upwardly. The bridge in turn also moves upwardly. As previously described, the spindles 90 are carried on this bridge and they are thus moved upwardly. All the spindles are rotated by means of the driving mechanism previously described. As has previously been indicated the spline 104 is in telescoping arrangement with the drive shaft 103 and thus as the bridge 85 is moved upwardly the spline 104 moves relative to the gear reduction mechanism 102, but is maintained in driving relation. Thus the spindles 90 are all rotating.

Thus, continued upward movement of the bridge 85 is effective to place the spindles 90 into engagement with the gears supported on the conveyor mechanism. The circular tip portion 91 of each spindle is moved into mating engagement with the hub portion of each gear and as the bridge 85 is moved upwardly the gears are moved upwardly from the trays 37. Continued upward movement of the bridge 85 causes the gears to be moved into the inductor coils 25 and the quench ring 30. At stations 1 to 4 and 8 to 11 inclusive, the movement of the gear into the inductor ring 25 is effective to displace the cooling casing 131, the operation of which will be described later.

It is, of course, apparent that the inductor ring 28 at station 5 is in a higher horizontal plane than the inductor rings 25, thus the gear must be raised higher at this station. As the bridge 85 is moving upwardly the pneumatic unit 122 is effective to move the driving shaft 95 at this station upwardly. In view of the vertical extent of the gear 112 the driving shaft continues to be driven by the gears 111, thereupon rotating the spindle 90 at this station. When the bridge 85 has moved to its maximum upward position the spindle 90 at station 5 has also moved vertically with respect to the bridge 85, thereupon in turn moving the gear at this station into the radio frequency inductor ring 28. While the remainder of the gears are thus under treatment at stations 1 to 4 and 6 to 11 the gear at station 5 is thus subjected to the radio frequency electromagnetic field. Before the bridge 85 is lowered, the pneumatic unit 122 is effective to lower the gear in station 5 into the quench coil 29, whereupon quenching takes place.

After this operation the unit 115 is again effective to lower the bridge to its normal position. As the spindles 90 are thereupon lowered, the gears at each station are again brought to rest upon the trays 37 and the conveyor is ready for indexing movement for moving the gears to the subsequent station.

With reference now to Figs. 5 and 6, the mechanism disclosed therein will be described. As previously mentioned, the first step is to index the conveyor, whereupon the trays are moved to a succeeding station. Before the piston rod 53 can be withdrawn into the cylinder 51 prior to its next pushing movement, it is necessary to disengage the dog 65 from one of the pins 60. In order to accomplish this, it is necessary to push the dog 65 downwardly about its pivotal point 62 and against the action of the leaf spring 63. A stop 260 connected to the bridge 85 is provided for this purpose. As the bridge 85 moves upwardly to remove the gears from the conveyor, the stop moves into engagement with the set screw 76 of the rocker arm 73. Continued upward movement of the stop 260 causes the rocker arm 73 to force the sliding pins 68 downwardly. As the pins 68 are moved downwardly against the pressure of the spring 70, the plate 67 is also forced downwardly. As the plate 67 is pushed downwardly it, in turn, reacts to push downwardly on the pin 66, thereupon moving the dog 65 downwardly out of engagement with the pin 60 of one of the trays 37. At this point the piston rod 53 is withdrawn into the cylinder 51. Upon this movement of the piston rod 53 the dog 55 is designed to pivot downwardly against the action of the leaf spring 58 upon engagement of the dog with any of the pins of the trays without effecting the position of the conveyor.

As the trays 37 are thus indexed from station to station, the finished gears move from station 11 to a position whereupon they are in vertical alignment with a vertically movable shaft 172 of the gear ejecting mechanism 170. Upon each movement of the bridge 85 upwardly the rack 207 functions to rotate the gear 204, thereupon effecting movement of the gear 203. As the gear 203 is rotated the universal drive shaft 201 is effective to rotate sprocket 200, this, in turn, actuating the chain 199 and thereupon rotating the shaft 190. As the shaft 190 is thus rotated the cam 178 is also rotated. The cam roller 176 of the shaft 172 in its normal position at the innermost point of the helical track 177. As the cam 178 is rotated the roller 176 rolls within the track 177 to the highest position on the cam 178, said highest position being at the outer end of the helical track 177. As this occurs, the shaft 172 is moved upwardly, whereupon the tip 173 of the shaft is moved through the opening 38 of the tray 37 positioned immediately above and in axial alignment with the shaft 172. The tip 173 engages the hub portion B of the gear A and lifts the same upwardly off of the tray 37. The gear is thus positioned slightly above the ejecting arm 195. Simultaneously with the movement of the cam 178 the pinions 192 and 193 are effective to rotate the shaft 194. As the shaft 194 is thus rotated the ejecting arm 195 is rotated about its vertical axis in a counter-clockwise manner, the slot 196 thereupon completely encircling the shaft 172. In this position the gear is a slight distance above the ejecting arm 195.

As the bridge 85 is thereupon lowered the universal drive shaft 201 works in reverse, thereby in turn reversing the operation of the cam 178 and the ejecting arm 195. Immediately upon lowering of the shaft 172 the gear which has been supported on this shaft is deposited on the ejecting arm 195. Continued lowering of the bridge causes the ejecting arm 195 to move in a clockwise manner into the position shown in Fig. 1. As the ejecting arm moves into position the gear engages the stop 197 and is thereupon pushed from the ejecting arm 195 into a discharge trough 261. Thus it can be seen that upon each indexing of the trays from one station to the other and upon a raising and lowering of the bridge one gear is removed from the conveyor.

In stations 1 to 4 and 8 to 11 a cooling system is provided for each of the inductor coils 25. During the operation of the machine it is desirable that the inductor coils 25 are continually energized so that an electromagnetic field is continually present. It can readily be seen that it is therefore desirable to provide a cooling means whereby the unloaded energized inductor rings can be cooled in an unloaded condition. The cooling system is best shown in Fig. 4. A cooling fluid continually passes from the conduit 157 into inner tube 150, whereupon the cooling liquid flows through the conduit 164 into the annular cooling chamber 132. The casing 131 is within the inductor ring 25 and thus is within the electromagnetic field provided by the ring. For the purpose of this application and the discussion of the operation of the mechanism 130 has been termed a "cooling mechanism." It may be more accurate to term this mechanism as a "dummy load arrangement" since it is similarly effective to take the place of a gear prior to the delivery of the same into the inductor ring.

The liquid flows from the chamber 132 into the conduit 162 through the bore 159 into the space formed between the outer edge of the inner tube 150 and the inner peripheral surface of the outer tube 149. The liquid flows through the opening 152 into the chamber 153 and outwardly through the conduit 158.

During the unloaded position of the inductor coil 25 the casing 131 is in the position shown in Fig. 4. As the bridge 85 moves upwardly and the gears A are moved into the inductor rings 25, the gear A engages the lower portion of the casing 131. Continued upward movement of the gear causes the complete displacement of the casing 131 from the inductor ring 25. The casing 131 continues to rest upon the upper edge of the gear which has displaced the casing. The gear A rotates the casing 131. The rotating sleeve 135 and the inner and outer tubes 149 and 150 continue to rotate with respect to the tubular support 137. The vertical pin 145 is effective to keep the tubular support 137 in vertical alignment with the inductor rings 25. As the bridge 85 again lowers and the gear A is withdrawn from within the ring 25 the casing 131 and tubular support 137 again move downwardly whereupon the cooling chamber is once again within the ring 25.

As best shown in Fig. 3, stations 5, 6 and 7 are provided with a rubber receptacle 265. At these stations the quench and blowoff of the quenching fluid is effected and the same flows into the receptacle 265. A spout 266 funnels the fluid down into a drain tank 267.

*The electrical operation*

Figure 15:
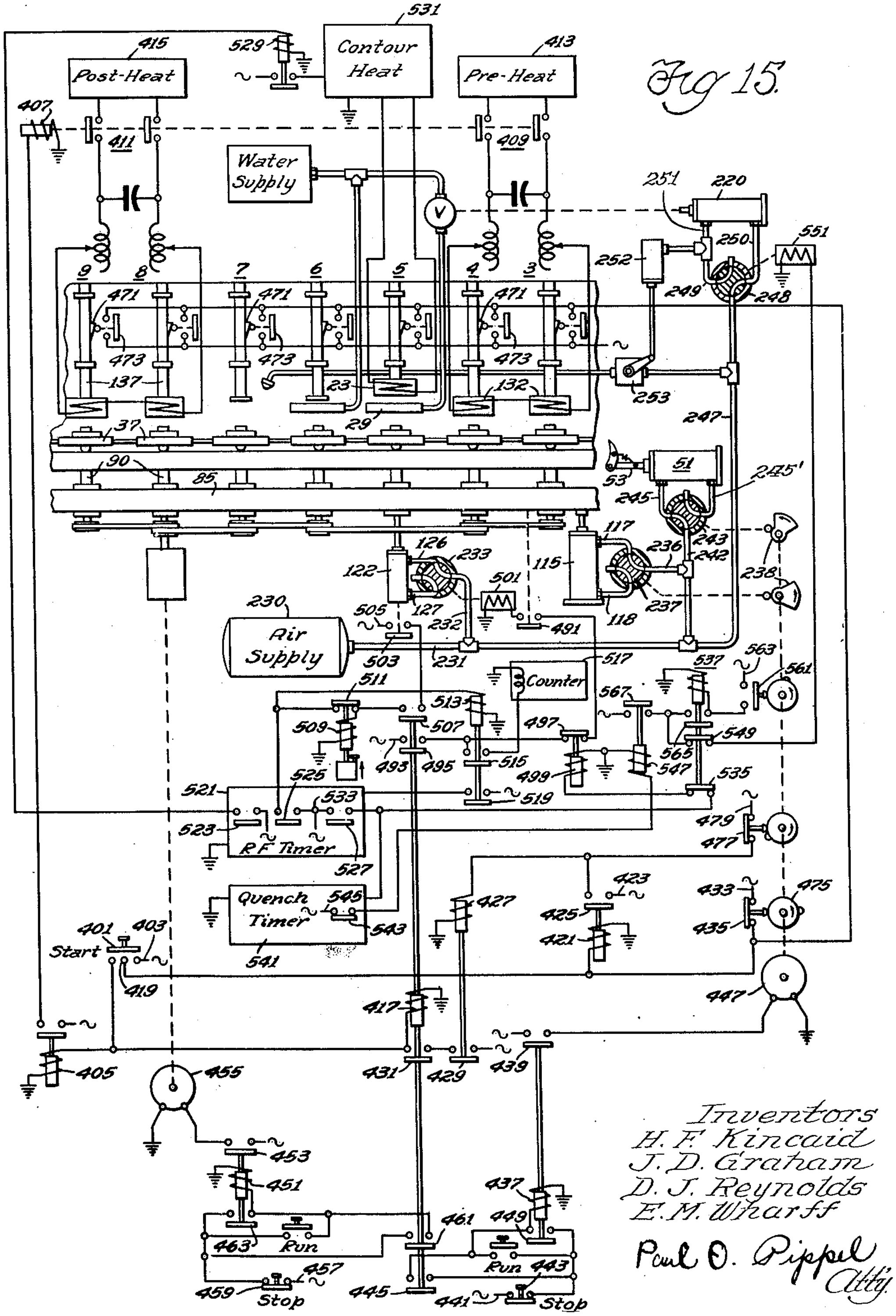
Fig. 15 is an electrical circuit diagram for the heat treating apparatus.

The electrical circuit diagram for the system is shown in Fig. 15. The operation of the system is initiated by closing a manually actuable start switch 401. Actuation of this switch closes a circuit extending from a "hot" terminal 403 of a power supply (not shown) through the switch 401, the exciting coil 405 of a main control relay to ground. This relay is now actuated closing a circuit through a coil 407 for actuating contactors 409 and 411 which close the supply circuits through the preheat and postheat low frequency generators 413 and 415, respectively. The latter are preferably of the motor-generator-set type although they may be of the electronic type.

The closure of the start switch 401 also closes a circuit from the terminal 403 through the switch, the exciting coil 417 of an initiating relay to ground. This initiating relay is now actuated initiating the operation of the various components of the system.

The actuation of a start switch also closes a circuit extending from the terminal 403 through an intermediate fixed contact 419 of the switch, the exciting coil 421 of a lock-in relay to ground. This lock-in relay picks up and closes a circuit from a "hot" terminal 423 of the supply through its contactor 425, the exciting coil 427 of a second lock-in relay to ground. Through a contactor 429 of the latter lock-in relay (427) and through one of its own contactors 431 the initiating relay (417) is locked in.

The switch 401 may now be released. With the switch released the first lock-in relay (421) remains energized in a circuit extending from a "hot" terminal 433 of the supply through a normally closed cam actuated switch 435, the exciting coil 421 of the relay to ground.

When the initiating relay (417) is actuated, a circuit is closed through the coil 437 for actuating the cam-motor contactor 439 which extends from a "hot" terminal 441 through a "stop" button 443, a now closed contactor 445 of the initiating relay, the exciting coil 437 to ground. The circuit through the cam motor 447 is now closed and locked in through a contactor 449 of the cam-motor relay (437). Another circuit is also closed through the coil 451 for actuating the contactor 453 for the spindle motor 455. This circuit extends from a "hot" terminal 457 of the supply through another "stop" button 459, another now closed contactor 461 of the initiating relay (417), the exciting coil 451 of the spindle motor contactor to ground. The spindle motor 455 is now energized and the spindles are rotated. The spindle motor contactor 453 is locked in through another contactor 463 of the relay (451).

The operation of the cam motor 447 causes the cam 238 to rotate to and actuate the bridge-lift valve 237. Fluid is injected into cylinder 115 and the spindle bridge 85 is lifted. The spindles 90 engage any gears that happen to be disposed on the trays 37 with which they are coaxial and raise the gears into the coils at stations 1, 2, 3 and 4, the quench rings at stations 5 and 6 and the coils at stations 8 to 11. The gears engage the casings 132 and raise the supports 137 as previously mentioned.

Each of these tubes of supports 137 carries a cam 471 for actuating the contact 473 of a switch which is open when the bridge is in the lowered position. When the tubes 137 are raised by the operation of the bridge, these switches (473) are closed. A switch (473) is thus closed at each position at which the spindle engages and raises a gear. These switches are connected in parallel with the cam operated switch 435 and maintain the circuit through the exciting coil of the lock-in relay (421) closed when the cam operated switch 435 is opened by the cam 475. Just after the bridge 85 is raised, the cam 475 rotates to a position at which it opens the switch 435 for a short time interval. If there are no gears on any of the spindles 90 raised by the bridge at this time, the circuit through the exciting coil 421 of the first lock-in relay is opened and this lock-in relay drops out. However, the second lock-in relay (427) which shunts out the start switch 401 at this time remains pulled up through a second cam actuated switch 477. The circuit through this latter cam actuated switch extends from a "hot" terminal 479 of the supply through the switch 477, the exciting coil 427 of the relay to ground. In the absence of gears on any of the spindles 90, the first lock-in relay (421) accordingly opens but does not at once cause the circuit through the start switch lock-in relay (427) to open. The cam motor 447 continues to operate and the valve 237 passes through a cycle during which it lowers the bridge 85 to its initial position. Shortly after the bridge is lowered to its initial position the second cam actuated switch 477 opens, opening the circuit through the exciting coil 427 of the start switch lock-in relay. Since the switch 401 is now open, the initiating relay (417) is de-energized and the operation of the system is stopped.

If, when the bridge 85 is raised, the spindles 90 carry one or more gears, the corresponding spindle limit switches 473 are closed when the first cam actuated switch 435 is open and the lock-in relay (421), and with it the start switch lock-in relay (427), both remain energized. When the bridge 85 arrives at its upper position it closes a bridge limit switch 491. The latter closes a circuit extending from a "hot" terminal 493 of the power supply through a new closed contactor 495 of the initiating relay (417), a normally closed contactor 497 of an auxiliary relay 499, a bridge limit switch 491, the solenoid 501 for valve 233 to ground. Valve 233 is now operated and a gear, if any is present on the spindle at station 5, is raised into the heating ring 23 at this station. A limit switch 503 is closed when the spindle at station 5 rises to its uppermost position closing a circuit which extends from a "hot" terminal 505 of the power supply through this limit switch, a now closed contactor 507 of the initiating relay (417), the exciting coil 509 of a relay which is slow to pick up to ground. The latter relay (509) remains in its initial position for a short time interval and a circuit is closed through its contactor 511 and through the exciting coil 513 of a timer relay. The timer relay (513) now picks up, closing at one of its contactors 515 a circuit through the operating coil of a counter 517 which indicates that one treatment is in process. At its other contactor 519 the timer relay closes a circuit through the initiating mechanisms (not shown) of a timer 521. This timer is preferably electronic and includes timing components (not shown) which may be of the usual capacity-resistor network type and a plurality of pairs of contacts 523, 525 and 527 respectively. Of these contacts, 523 and 525 are closed immediately after the timer relay (513) is actuated; the other 527 is closed when the timing period for the timer 521 expires.

Timers which would serve the purposes of our invention are available in large numbers in the art. A representative type is shown in a copending application, Serial No. 16,860, filed March 24, 1948, to Edward C. Hartwig, which has now issued as U. S. Patent No. 2,533,318, and assigned to the Westinghouse Electric Corporation. The Hartwig timer is designed to perform a larger number of functions than is involved here but can be modified to satisfy the present purposes.

At the now closed contact 525, the timer relay (513) is locked in. At the now closed contact 523, a circuit is closed through the exciting coil 529 of a contactor for the contour heater 531. This contactor (529) is now closed, energizing the high frequency contour heater, and any gear disposed in the heater ring 23 is heated by induction.

While the timer 521 is passing through its timing operation, the sluggish relay (509) operates. The timer relay (513), however, remains energized. The actuation of the sluggish relay (509) precludes a second actuation of the timer relay (513) once the timing operation is completed and the timer relay is de-energized.

When the timer 521 completes one phase of its operation, the contact 523 is opened, opening the contour heater circuit. The contact 525 opens, resetting timer relay (513). The other contact 527 closes at the end of the first phase of the operation and remains closed.

When contact 527 closes, it closes a circuit extending from a "hot" terminal 533 of the supply through the contacts, a normally closed contactor 535 of a terminating relay 537, the exciting coil of the auxiliary relay 499 to ground. The latter relay (499) is actuated, opening the circuit through the solenoid 501 of the valve 233. The gear at station 5 is now dropped by the spindle to the quench ring 29 at the level of the other gears.

Through now closed contactor 527 the initiating circuit for the quench timer 541 is also closed. The quench timer 541 may also be of the electronic type. A predetermined time after the closing of the contact 527, the contact 543 of the quench timer opens. This contact remains open until the timer 541 begins a succeeding timing operation. The circuit is now opened from a "hot" terminal 545 through the exciting coil 547 of the quench relay to ground. The quench relay (547) drops out, closing a circuit through a normally closed contactor 549 of the terminating relay 537 and the solenoid 551 for valve 248. Valve 248 operates, releasing quenching fluid and air for blowing off any gear at station 7.

While these events are taking place the cam motor 447 continues to rotate. Evenutally cam 238 reaches a position at which the valve 237 operates. The fluid from cylinder 115 is now exhausted and bridge 85 begins to drop, opening the limit switch 491.

Before the bridge has dropped substantially, a cam switch 561 is closed momentarily. A circuit is then closed which extends from a "hot" terminal 563 of the supply through the cam switch 561, a conductor, the exciting coil of the terminating relay 537 to ground. This relay is immediately actuated and is locked in through one of its closed contactors 565 and the now closed contactor 567 of the quench relay (547). At one of its now open contactors 569, the termination relay 537 opens the circuit of the solenoid 551 for valve 248. This valve operates exhausting the cylinder 228 and stopping the flow of quench liquid and air. At another now open contactor 535, the circuit through the exciting coil of the auxiliary relay 499 is opened and the latter resets for another operation. Since the bridge limit switch 491 is now open, the solenoid 501 remains currentless.

The bridge 85 now drops to its initial position. The cam 238 continues to rotate eventually closing valve 243. Rod 53 is now actuated, advancing the gears each to the succeeding station. The system is now in a condition for a repeat operation.

During the succeeding operation contact 527 opens when the timer 521 is initially actuated on actuation of the timer relay (513). When contact 527 opens quench timer 541 resets. The quench relay (547) is now actuated opening its contact 567 and resetting the terminating relay 537.

Our system is designed for high speed operation. A typical period for a complete cycle is of the order of five to seven seconds. The RF timer has a time period of the order of .7 of a second. The quench relay, that is the time interval between the termination of the RF heating operation and the initiation of the quench operation, is of the order of .3 of a second. A gear deposited on a tray 37 passes through the machine and is discharged in a time interval of the order of one minute after it is deposited.

It can now be seen that a novel heat treating apparatus has been provided which will fully accomplish the desired objects of the invention. It must be understood, of course, that changes and variations may be made which do not depart from the spirit of the invention as disclosed nor the scope thereof as defined in the appended claims.

What is claimed is:

1. An apparatus for heat treating an article comprising a plurality of horizontally spaced pre-heat stations, a pre-quench station, each of said stations including an inductor ring, said rings being positioned in horizontally spaced relation, an endless carrier for movably supporting articles to be heat treated, said carrier including a plurality of trays, means for moving each tray successively into axial alignment with each inductor ring, means for moving the articles from said carrier including a pair of horizontally spaced upright members, a vertical track on each member, a bridge vertically movable between said upright members, said bridge including a pair of horizontally spaced vertical supports having bearing means engaging said tracks, a horizontal beam connecting said vertical supports, a plurality of rotatable spindles mounted on said horizontal beam and in axial alignment with said inductor rings, means for rotating said spindles, and means constructed and arranged to vertically move said bridge, said spindles thereupon engaging the articles on said carrier and thereby moving the same into said inductor rings.

2. An apparatus for heat treating an article comprising a plurality of horizontally spaced pre-heat stations, means for producing an alternating electromagnetic field of a first frequency at said pre-heat stations, a pre-quench station, means for producing an alternating electromagnetic field of a substantially higher frequency than said first frequency at said pre-quench station, an endless carrier for movably supporting articles to be heat-treated, said carrier including a plurality of trays having centrally located openings, means for supporting the articles to be treated on said trays, means for indexing said trays to successively move each tray from one station to the other, means for moving the articles to be treated from said carrier into the electromagnetic fields including, a pair of horizontally spaced upright members, a bridge vertically movable between said upright members, said bridge including a pair of horizontally spaced vertical supports engaging said uprights for movement with respect thereto, a horizontal beam connecting said vertical supports, a plurality of spindles mounted on said beam, said spindles being in axial alignment with said stations, means for rotating said spindles, and means constructed and arranged to bodily move said bridge, said spindles thereupon moving through the openings of said trays thereby removing the articles to be treated and moving the same into the electromagnetic fields of said stations.

3. An apparatus for heat treating an article comprising a plurality of horizontally spaced stations, means for producing an alternating electromagnetic field at said stations, a carrier for movably supporting articles to be heat treated, said carrier including a plurality of trays having openings, means for supporting the articles to be treated on said trays, means for indexing said trays to successively move each tray from one station to the other, means for moving the articles to be treated from said carrier into the electromagnetic field including, a pair of horizontally spaced upright members, a bridge vertically movable between said upright members, said bridge including a pair of horizontally spaced vertical supports engaging said uprights for movement with respect thereto, a horizontal beam connecting said vertical supports, a plurality of spindles mounted on said beam, said spindles being in axial alignment with said stations, means for rotating said spindles, and means constructed and arranged to bodily move said bridge, said spindles thereupon moving through the openings of said trays thereby removing the articles to be treated and moving the same into the electromagnetic fields of said stations.

4. An apparatus for heat treating an article comprising a plurality of horizontally spaced stations, means for producing an alternating electromagnetic field of a first frequency at said stations, a plurality of movable trays having openings therein, means for supporting the articles to be treated on said trays, means for indexing said trays to successively move each tray from one station to the other, means for moving the articles to be treated from the trays into the electromagnetic fields including, a pair of horizontally spaced upright members, a bridge vertically movable between said upright members with respect thereto, a plurality of spindles mounted on said bridge, said spindles being in axial alignment with said stations, means for rotating said spindles, and means constructed and arranged to bodily move said bridge, said spindles thereupon moving through the openings of said trays for engaging the articles to be treated and moving the same into the electromagnetic fields of said stations.

5. An apparatus for heat treating an article comprising a plurality of heat treating stations, means for producing an electromagnetic field at said stations, means for handling the articles to be treated, said means including a bridge, means for supporting articles to be treated on said bridge, means for raising and lowering said bridge thereby moving the articles to be treated into and out of the electromagnetic fields, and conveyor means constructed and arranged for moving each article to be treated to successive different positions on said bridge whereby each article is successively moved into and out of the field at each station.

6. An apparatus for heat treating an article comprising a plurality of heat treating stations, means for producing an electromagnetic field at said stations, means for handling the articles to be treated, said means including a horizontally extending member, means for supporting articles to be treated on said horizontally extending member, means for raising and lowering said horizontally extending member thereby moving the articles to be treated into and out of the electromagnetic fields, and conveyor means supported on said horizontally extending member, said conveyor including indexing means constructed and arranged for moving each article to be treated to successive different positions on said horizontally extending member whereby each article is successively moved into and out of the field at each station upon each raising and lowering of said horizontally extending member.

7. An apparatus for heat treating metal articles comprising a plurality of inductor rings, means for handling articles to be treated including an article supporting means, said supporting means vertically movable to move articles into and out of heat treating relation with respect to said inductor rings, and conveyor means supported on said article supporting means constructed and arranged to move each article to be treated to different positions on said supporting means whereby each article is successively moved into and out of heat treating relation with respect to each inductor ring upon successive vertical actuation of said supporting means.

8. An apparatus for heat treating metal articles, said apparatus having a plurality of heat treating stations, an endless carrier for delivering articles to be heated to the stations, said carrier including a plurality of trays having centrally located openings over which the articles to be treated are supported, a plurality of spindles, means for moving said spindles vertically through the openings in said trays thereby moving the articles to be treated into said heat treating stations, said spindles being thereupon operable for returning the articles to said trays, means for moving the carrier for successively moving each tray from one station to the other, means for ejecting the treated gears from said trays, said means including an ejection spindle, means for moving said ejecting spindle vertically through each tray thereupon lifting the article thereon above said tray, a rotatable ejection arm constructed and arranged to engage the treated article upon lowering of said ejection spindle, and means for moving said ejection arm to eject the treated article therefrom.

9. An apparatus for heat treating a metal article including an inductor ring, means for producing an electromagnetic field within the inductor ring, means for cooling said inductor ring comprising a casing having an annular chamber, said chamber being positioned within said inductor ring adjacent the inner peripheral surface of the same, a tubular support, means rotatably connecting said casing to said tubular support, fluid inlet and fluid outlet conduits positioned within said tubular support and in communication with said annular chamber, a carrier for delivering articles to be treated adjacent to said inductor ring, means for removing the articles from said carrier, said means including a rotatable spindle, means for moving said spindle into engagement with the articles to be treated thereby moving the articles from the carrier into the inductor ring, the article to be treated thereby engaging said casing and axially moving the same out of the inductor ring, and means for rotating said spindle and the article to be treated within said inductor ring, said casing being movable into said ring upon the removal of the article from said ring.

10. An apparatus for heat treating a metal article including an inductor ring, means for producing an electromagnetic field within the inductor ring, means for cooling said ring comprising a casing having an annular chamber positioned within the inductor ring, a support for movably supporting said casing and the chamber within said ring, conduit means for circulating a fluid through said chamber, a carrier for delivering articles to be treated adjacent to said ring, a rotating member operable for carrying the articles to be treated from said carrier, means for rotating said rotating member and the article to be treated, means constructed and arranged for moving the article to be treated into said electromagnetic field and means simultaneously engageable with said cooling chamber for moving said cooling chamber from said inductor ring.

11. An apparatus for treating a metal article including an inductor having an inner peripheral surface for encircling the article to be treated, means for producing an electromagnetic field in the inductor, means for cooling the inductor previous to the delivery of an article to be treated to said electromagnetic field, said means including a cooling chamber positioned adjacent the inner peripheral surface of the inductor conduit, means communicating with said chamber for supplying fluid to said chamber, and movable means for delivering an article to be treated to said field, said last mentioned means being constructed and arranged to engage and displace said chamber from said inductor.

12. An apparatus for treating a metal article, including an inductor having an inner peripheral surface for encircling the article to be treated, means for producing an electromagnetic field in the inductor, means for cooling the inductor previous to the delivery of an article to be treated to said inductor, said means including a movable cooling chamber arranged within the inductor, fluid conduits communicating with said chamber, a spindle in axial alignment with said inductor, means for supporting the article to be treated on said spindle, and means constructed and arranged for moving said spindle axially thereby moving the article to be treated into the inductor, said article engaging said cooling chamber whereby the cooling chamber is simultaneously moved out of said inductor.

HOMER F. KINCAID.
JOHN D. GRAHAM.
DELOS J. REYNOLDS.
EDWARD M. WHARFF.

References Cited in the file of this patent

UNITED STATES PATENTS

| Number | Name | Date |
|---|---|---|
| 1,696,659 | Ward | Dec. 25, 1928 |
| 1,748,465 | Summey | Feb. 25, 1930 |
| 1,803,500 | Fagan | May 5, 1931 |
| 1,848,827 | Fink et al. | Mar. 8, 1932 |
| 1,861,869 | Long | June 7, 1932 |
| 1,895,184 | Douglass et al. | Jan. 24, 1933 |
| 1,913,743 | Borchert | June 13, 1933 |
| 2,085,767 | Reid | July 6, 1937 |
| 2,280,064 | Denneen et al. | Apr. 21, 1942 |
| 2,288,036 | Somes | June 30, 1942 |
| 2,318,598 | Davis | May 11, 1943 |
| 2,319,167 | Stewart | May 11, 1943 |
| 2,351,888 | Stewart | June 20, 1944 |
| 2,411,698 | Somes | Nov. 26, 1946 |
| 2,430,005 | Denneen et al. | Nov. 4, 1947 |
| 2,444,259 | Jordan | June 29, 1948 |
| 2,454,039 | Cox | Nov. 16, 1948 |
| 2,456,962 | Lee | Dec. 21, 1948 |
| 2,457,758 | Vore | Dec. 28, 1948 |
| 2,464,727 | Storm | Mar. 15, 1949 |
| 2,504,198 | Jagen | Apr. 18, 1950 |
| 2,506,425 | Journeaux | May 2, 1950 |
| 2,564,906 | Kincaid | Aug. 21, 1951 |